June 20, 1961 J. E. VISTAIN, JR 2,989,312

AUTOMATIC RECORD PLAYER

Filed Nov. 8, 1951 6 Sheets-Sheet 1

INVENTOR.
James E. Vistain Jr.
BY J. V. Douglas
His Atty.

INVENTOR.
James E. Vistain Jr.
BY
J. W. Douglas
Atty.

INVENTOR.
James E. Vistain Jr.
BY
J. D. Douglas
His Atty.

June 20, 1961 J. E. VISTAIN, JR 2,989,312

AUTOMATIC RECORD PLAYER

Filed Nov. 8, 1951 6 Sheets-Sheet 4

INVENTOR.
James E. Vistain Jr.
BY
J. N. Douglas
His Atty.

AUTOMATIC RECORD PLAYER

Filed Nov. 8, 1951 6 Sheets-Sheet 5

INVENTOR.
James E. Vistain Jr.
BY
J. D. Douglas
His Atty.

AUTOMATIC RECORD PLAYER

Filed Nov. 8, 1951 6 Sheets-Sheet 6

INVENTOR.
James E. Vistain, Jr.
BY
J. W. Vorenkamp(?)
His Atty.

United States Patent Office 2,989,312

Patented June 20, 1961

2,989,312

AUTOMATIC RECORD PLAYER

James E. Vistain, Jr., Chicago, Ill., assignor to Admiral Corporation, Chicago, Ill., a corporation of Delaware Filed Nov. 8, 1951, Ser. No. 255,344
11 Claims. (Cl. 274—10)

This invention relates to improvements in phonograph record players for reproduction of a group of records magazined on a spindle from which the records are delivered in one-by-one order to a turntable, it is especially directed to selector mechanism which determines the angular position to which the pickup arm is swung for its initial engagement with a record.

Among the improvements incorporated in the present invention are those which provide for ease in operation of the mechanism, convenience of repair or adjustment and economy in manufacture.

Other advantages of the invention will be set forth in part hereinafter and in part will be obvious herefrom, or may be learned by practice with the invention, the same being realized and attained by means of the instrumentalities and combinations pointed out in the appended claims.

Figures 1, 2:
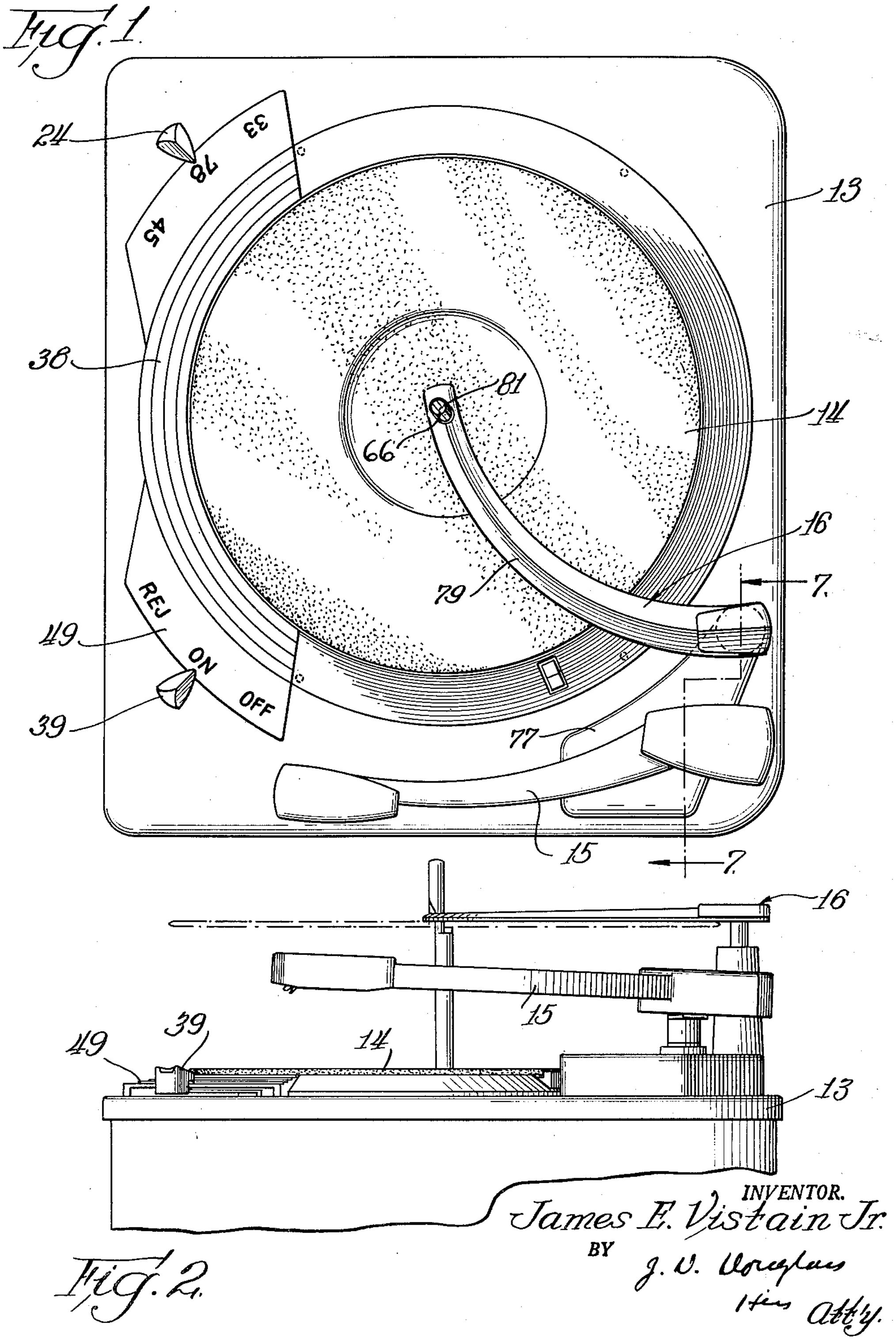
FIG. 1 is a top plan view of a record player in which the invention is incorporated.
FIG. 2 is a side elevational view thereof, the lower portion of which is broken away.

The record player, as will be noted particularly in FIG. 1, comprises a base plate 13 for support of a turntable 14, pickup arm 15 and keeper or record stabilizing mechanism 16. The turntable 14 includes a peripheral depending flange 17 (FIG. 4) in driving association with a floating idler wheel 18 (FIG. 3) an element of a motor drive unit 19. Preferably, the motor drive unit 19 includes a motor 22 which is connected to an electrical circuit by a switch 23, and is of the class which is adapted to operate the turntable at a plurality of speeds and is supported from the base plate 13 at an aperture 21 therein. Means by which the switch may be operated will be described hereinafter.

The speed of turntable 14 may be changed by moving a manual control knob 24 (FIG. 1) on one end of a lever 26 (FIG. 3) that passes vertically through an arcuate slot 27, in the base plate, about a pivot 28 by which the lever is secured to said base plate. The other end of lever 26 carries a pin 29 which extends downward through a second slot 31 for cooperation with an arm 32, said arm having a straight slot 33 therein that receives the pin. The arm 32 is swingable about a driven shaft 34 of the motor 22. Consequently, moving the lever 26 clockwise, for example, causes the arm 32 to be moved counterclockwise to carry thereon drive member 36, on one side of shaft 34, into driving engagement with the idler 18. Motion of the arm 32 in the opposite direction carries a second drive member 37 on another side of shaft 34 into engagement with the idler 18 concurrently with withdrawal of the member 36 from engagement with idler 18. The idler 18, on the other hand, is spring-biased toward the shaft 34 so that when the arm 32 is in a position intermediate the two positions alluded to, there is driving relationship between the shaft and floating idler. Belts connect the motor shaft 34 and the members 36 and 37.

Indicia to denote the setting of arm 32 is carried by an ornamental escutcheon 38, on the base plate, about the turntable. The member 38 may be of some suitable plastic material and bears the characters 33, 45 and 78 alongside the course through which the knob 24 is adapted to swing, the characters, of course, denoting turntable speeds of 33⅓, 45 and 78.26 r.p.m.

Figures 3, 4:
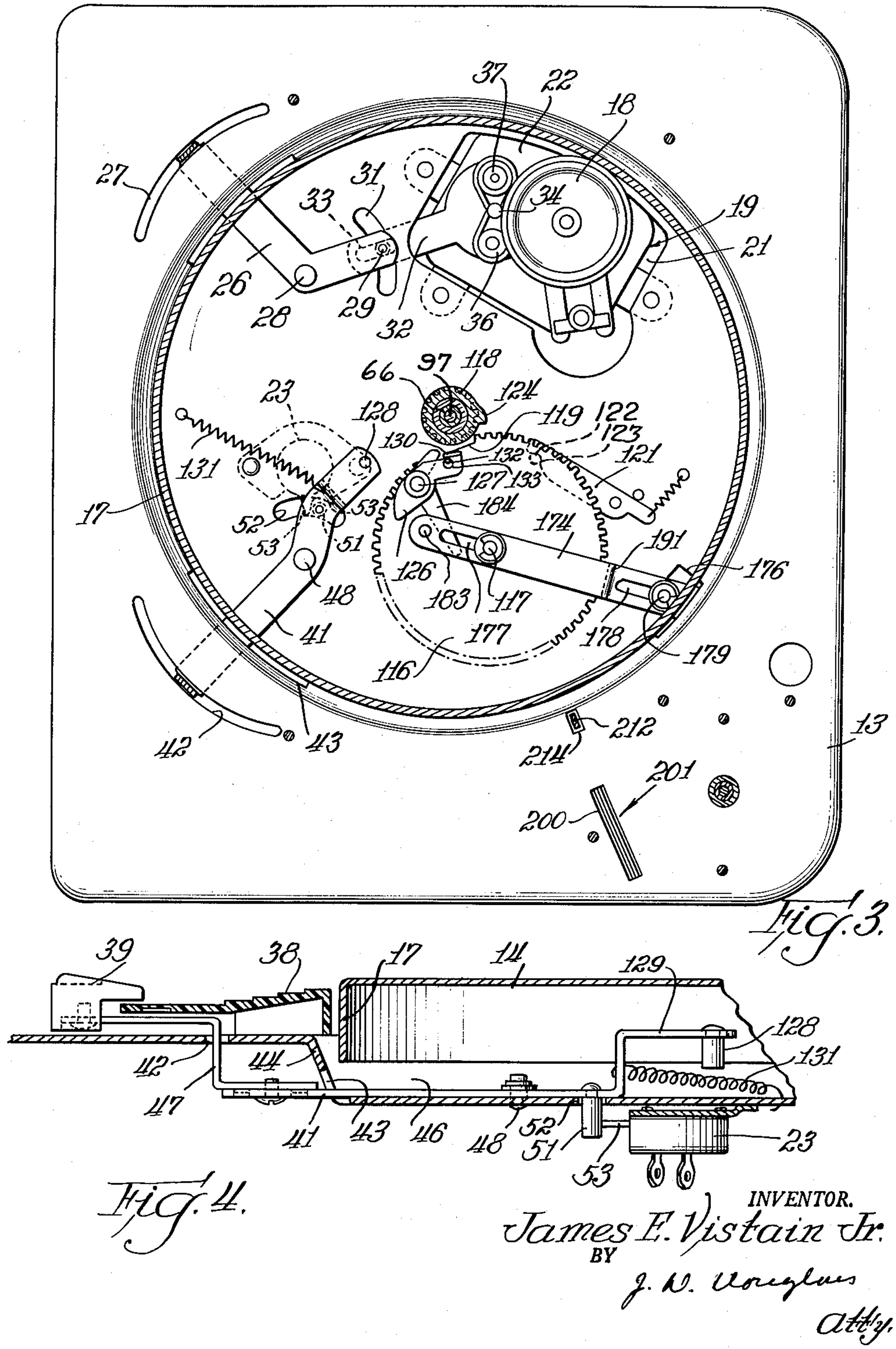
FIG. 3 is also a top plan view of the novel record player some of the parts of which have been removed and others broken away to show underlying parts.
FIG. 4 is a fragmentary vertical section taken on line 4—4 of FIG. 5.

The escutcheon 38 also extends beneath a second knob or pointer 39 (FIGS. 1 and 4). The pointer 39 is carried by a composite lever 41 movement of which, manually by the pointer, conditions the record player for start of a record changing cycle, completely stops the machine or conditions it for reproduction of a record. To accommodate the lever, the base plate is provided with a first arcuate slot 42, in the horizontal surface of said base plate, and a second slot 43, in an inclined peripheral wall 44 of a turntable well or depressed region 46 of the base plate 13. For its extension through the slots 42 and 43, lever 41 is offset at 47. The lever 41 is secured to the base plate by a pivot 48, about which it is adapted to swing.

As will be noted (FIG. 1), the pointer 39 is associated with the part 49 of the escutcheon which includes the indicia "Rej, On and Off," on the arcuate part 38, although this indicia on the base plate 13 without use of the member 38 is also contemplated. When the pointer 39 is adjacent the "Off" marking the motor 22 is not running since the switch 23 is open.

In order that the record player may be started, it is necessary to move the pointer 39 from its "Off" position into adjacent relationship to the "On" marking to close switch 23. This is effected as follows: The lever 41 carries a pin 51 extending downward through a slot 52, in the base plate, which is arcuate of pivot 48. Switch 23, on the other hand, has a lateral pair of fingers 53 which are integral with each other and between which the pin 51 is carried to close and/or open the switch, as will be apparent from FIG. 5.

The structure of switch 23 is conventional and consequently will not be described in detail. It is, however, preferably of the snap variety wherein the fingers 53 are either an "On" or an "Off" position. When the knob 39 is grasped and moved to its "On" position, lever 41 is moved against resistance of a spring 131 having one end anchored to said lever and the other end to the base. When pointer 39 is released in its "On" position, the force of spring 131 is insufficient, however, to return said knob to its "Off" position owing to the force internally of switch 23 for biasing the switch fingers to the position indicated. When the pointer in moved into adjacent relationship to the "Rej" indicia, a record on the turntable is "rejected" by initiation of a record changing cycle. The mechanism by which this is carred out will be described hereinafter. Furthermore, the increase of tension in spring 131 consequent to moving the pointer 39 beyond its "On" position toward its "Rej" position is adequate to return said pointer, when released, to its "On" position without disturbing the closed status of switch 23.

Figure 5:
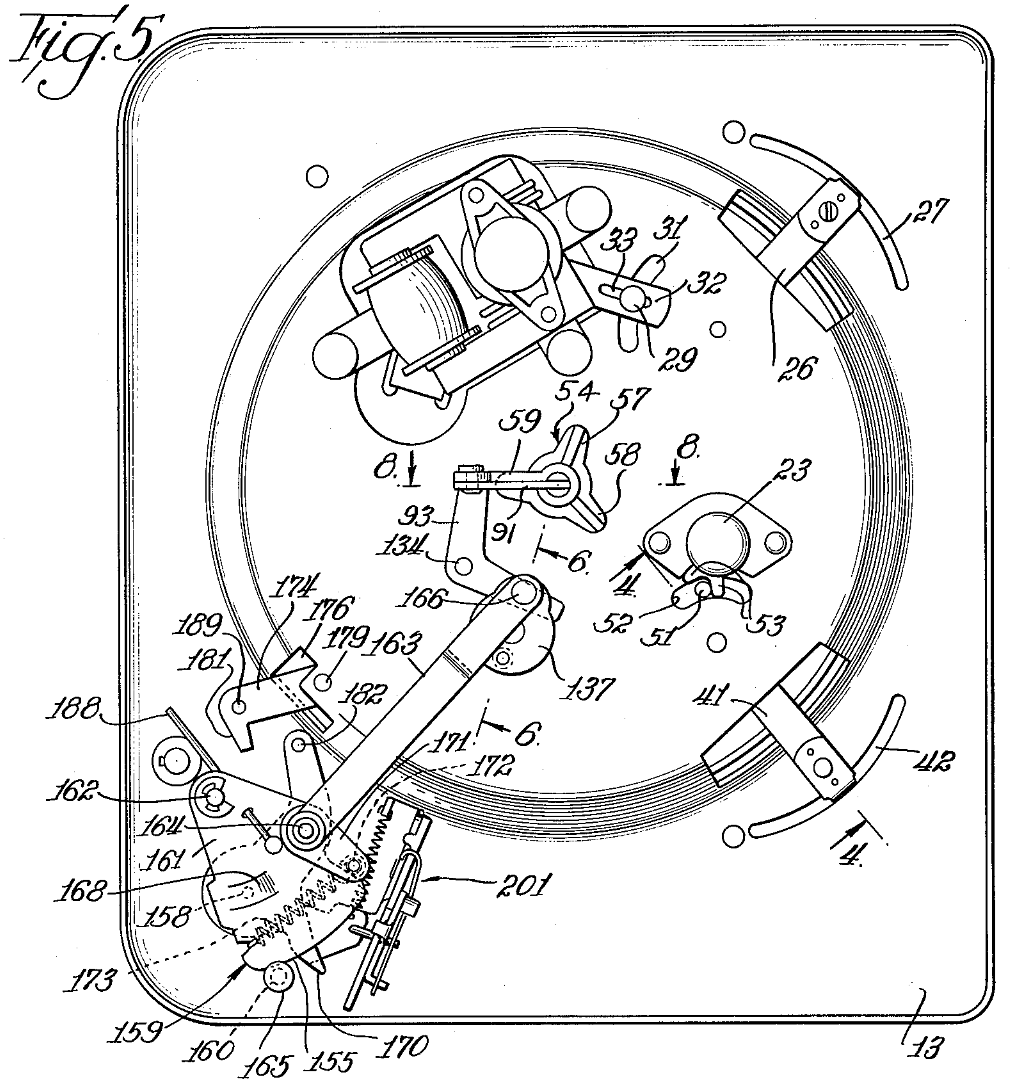
FIG. 5 is a bottom plan view of the record player.
Figures 7, 8, 14:
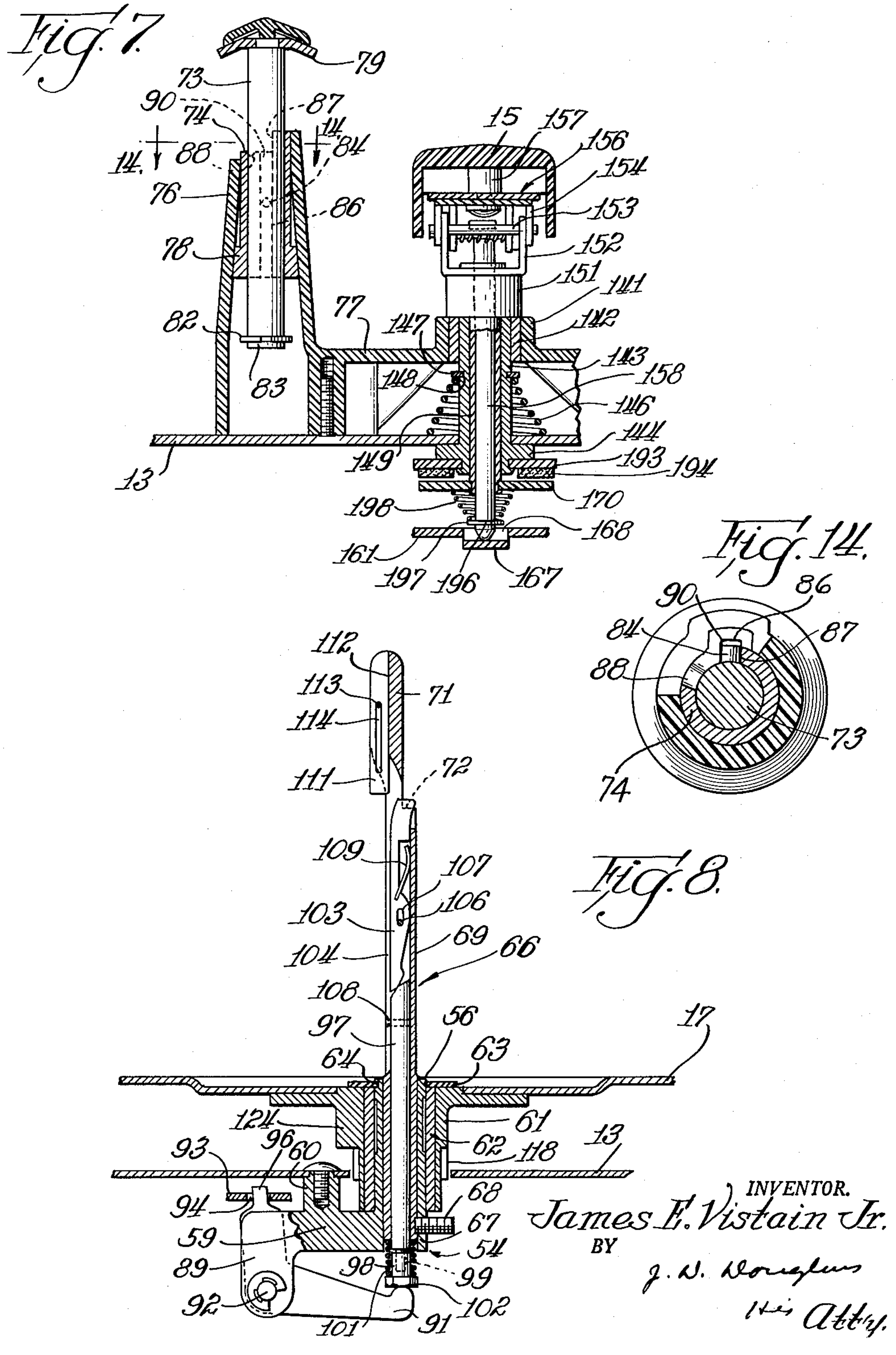
FIG. 7 is a fragmentary vertical section taken on line 7—7 of FIG. 1.
FIG. 8 is a fragmentary vertical section taken on line 8—8 of FIG. 5, the keeper having been removed.
FIG. 14 is a section taken on line 14—14 of FIG. 7.

The turntable is operatively supported from the base plate 13 by a bearing member 54 (FIGS. 5 and 8). It is preferably a diecasting having a tubular portion 56, retained in vertical relationship to the base plate 13 by arms 57, 58 and 59 radiating from the lower end of the portion 56, each of the arms being provided with bosses 60 which extend upward to the base plate, to which they are bolted. The turntable 17 has a hub 61 within which is an antifriction bushing 62 for journalled relationship to the tubular portion 56. If desired, a C-washer 63 may be clipped in an annular groove 64, on the upper end of the tubular portion 56, to hold the same in position. The bearing member 54 also provides support for a spindle 66, later to be described in detail.

The structure and function of the spindle 66 has been previously described in my co-pending application, Ser. No. 218,493, filed March 30, 1951. It should be noted that the side of the spindle, at the lower end thereof, is provided with a flat surface 67 which is engaged by a set screw 68 threaded in the tubular portion 56, both to lock the spindle against rotation and adjustably secure it against axial displacement. In accordance with the description alluded to, it is further noted that the diameter of the spindle above the level of the turntable is of reduced diameter to afford a support or guide portion 69 while an upper or pilot portion 71 is offset from the guide portion thereby providing at the upper end of the guide portion a shoulder or seat 72 against which the lowest of a stack of records is adapted to rest when the center holes of the records are threaded over the pilot portion.

Although records of small diameter, i.e., those of 7-inch size, are adapted to be operatively magazined on the shoulder 72 from which they are released to the turntable in one-by-one order by means later to be described; heavier records, especially those of 12-inch and 10-inch diameter, are often susceptible of tipping about the shoulder during their support thereby. Therefore, a hold-down or keeper means is provided. It comprises a vertical shaft 73 (FIG. 7) which is journaled for axial and rotary motion in a control bushing 74 supported from the base plate 13 by a pedestal 76 which may be an integral part of a combination bearing member 77. Preferably, the bearing member 77 is of some suitable plastic material such as "Bakelite," and because of this, the lower portion of the bushing 74 may be knurled at 78 in order that rigid relationship between the bushing and pedestal may be assured. Additionally, the keeper means includes a keeper arm 79, one end of which is rigidly fixed to the shaft 73 from which it extends horizontally a sufficient distance to enable it to be swung over the upper extremity of the spindle 66. The swingable end of the arm 79 is provided with a hole 81 through which the spindle may project when said arm is lowered over the spindle. This, of course, is in order that the keeper arm may rest upon the top of a stack of records when they are supported by the shoulder 72, to restrain the records from tipping about the shoulder 72.

From its uppermost position, wherein the keeper arm 79 is above the level of the spindle, the shaft 73 is adapted to slide downward, by gravity, until said arm is in its lowest position, and said arm is substantially below the level of the shoulder 72, at which time the keeper arm 79 rests on the pedestal 76. The weight of the keeper 16 is adapted to be supported from the shoulder 72, however, so long as a record remains thereon. In order that the arm 79 may move freely downward to its lowest extremity, the hole 81 is elongated radially of the axis of shaft 73 so that said arm may clear the spindle shoulder 72.

It is, of course, necessary to remove the keeper arm 79 from the spindle for loading the latter with unplayed records, or removing the records from the turntable after they have been reproduced. In its removal, the keeper arm is manually raised to a limit permitted by stop means provided preferably by resilient C-washer 82 clipped in an annular groove 83 about the lower end of the shaft 73, the washer engaging the bushing 74 when the keeper arm is clear of the top of spindle 66. Also during this operation, a pin 84 extending laterally from the shaft 73 intermediate its ends, travels in a straight keyway 86 internally of the bushing 74. The confining influence of keyway 86 on pin 84 maintains the keeper arm against angular movement during this motion so that there is no scraping between the edges of the hole 81 and the spindle 66. Once the pin 84 is above the upper end of keyway 86, and the arm 79 concurrently free of the spindle, said arm may be moved angularly to a limit permitted by horizontal movement of the pin 84 within vertical sides 87 of a notch 90 in the upper end of pedestal 76 and bushing 78. Additionally, the bushing 74 may have a socket or radial groove 88 laterally of the bottom of notch 90 in which the pin 84 is adapted to rest when the keeper arm is released in its outermost position. If desired, the keeper arm 79 may be of curved formation (FIG. 1) to be more uniformly spaced from the records as they are removed from the turntable and/or loaded on the spindle. After a stack of unplayed 10-inch or 12-inch records are in position on the shoulder 72, the arm 79 is lifted slightly to remove the pin 84 from the socket 88. Then the arm 79 is swung toward the axis of the spindle until the hole 81 is in position to be threaded over the pilot portion 71. The pin 84 then entering the keyway 86, the keeper is lowered until arm 79 rests on the topmost of the stack of records. In this position, the weight of arm 79 and attached parts is adequate to restrain one or more records from tipping about the shoulder 72.

Although a description of the spindle per se has been set forth in the application aforesaid, reference to the details of said spindle is advisable in order that the significance of elements for co-operation with the spindle may be understood. Therefore, it should be pointed out that the radial arm 59 (FIG. 8) is provided with a downwardly extending portion 89 to which a bell-crank lever 91 is pivoted at 92. The lever 91 is rocked about its pivot by cyclically operated mechanism, later to be referred to, which includes a lever 93, apertured at 94 to receive a finger portion 96 at one end of the bell-crank lever 91. The other end of lever 91 extends under the end of the spindle 66.

The spindle guide portion 69 is tubular and carries therein a cam rod 97, which has an adjustment screw 98 to adjustably vary the spacing between said lever and said rod. This is effected by an end portion 99, of reduced diameter, which is threaded into the hollow threaded shank of the screw 98. The rod 97 is biased downward by a compression spring 101 between the lower end of the spindle guide portion 69 and a head 102 on the screw 98. Motion of the lever 93 is, therefore, responsible for longitudinal motion of the rod 97 for cooperation with an ejector dog 103 supported within a slot 104 by means including a pin 106 on the guide portion 69 which extends through a slot 107 in the ejector dog. To resist its tendency to rotate the rod 97 also bears a pin 108, which extends into the slot 104 so that when the rod 97 is moved upwardly, its cam shaped upper end is adapted to operatively engage the dog 103 to first move the dog to its upper limit permitted by the slot 107 and then to swing it slightly clockwise to the position illustrated (FIG. 8). Prior to this operation, the upper extremity of the dog 103 does not extend above the shoulder 72. In the course of an ejecting operation the dog 103 is moved upward only enough to enter the center hole of the bottommost record of the stack which is displaced to the right adequately to be beyond the support of the shoulder 72 from which said record drops and is guided down to the turntable by the spindle guide portion 69. Thereupon the dog 103 assumes support of the remaining records of the stack and lowers them gently to the support of shoulder 72 as the bell crank lever 91 is moved clockwise. As soon as support of the records has been transferred from the dog 103 to the shoulder 72 said dog is swung counterclockwise, about pin 106, by a leaf spring 109 thereon to return the dog to its normal position. Following the actual ejecting operation of the lowermost record, the remaining records, while being lowered to the shoulder 72 are guided to the support thereof by a slider 111.

The slider is slidably retained in a kerf 112 in the pilot portion 71 by a pin 113 passing through a slot 114 in said slider. Although slidable upward by a record to permit its removal from the spindle, the slider is normally in the position, in which it is indicated, wherein its lower extremity is spaced from the level of shoulder 72, by at least the thickness of a record, to permit the lowermost of a stack of records to be discharged from the shoulder in the manner just described.

The means by which the spindle 66 is thus activated, by operation of the bell crank lever 91, includes cyclically operative mechanism a description of the structure of which has been indicated in detail, in my co-pending application Ser. No. 161,370, filed May 11, 1950. The operation of the cyclically operative mechanism is adapted to be initiated both automatically and manually. Briefly, it comprises a mutilated gear 116 (FIG. 3). It is fixed to the upper end of a shaft 117 conveniently supported from the base plate 13 with respect to which said shaft is rotatable and co-operatively associated with a pinion 118 on the hub 61. During reproduction of a record a blank space 119 in the series of teeth of gear 116 is opposite the pinion 118 so that the gear is motionless. This status of the gear is releasably maintained by a spring-biased lever 121. The gear 116 has a pin 122 thereon adapted to be retentively engaged by in a notch 123 on the lever 121 until an increment of motion is imparted to the gear by a striker member 124, also on the hub 61, to provide a state of meshed engagement between the teeth of the pinion and gear rotating the gear until the blank space 119 is returned to the pinion and the gear is again held by the lever 121, a cycle of motion having been completed.

The increment of motion necessary for starting cyclic motion of the gear 116 is provided partly by a dog or lever 126 (FIG. 3). It is pivotally supported at 127 from the gear 116 and is adapted to be engaged by a pin 128 (FIG. 4) carried by an off-set portion 129 of the lever 41. As the pointer 39 is moved to "Rej" (FIG. 1) the pin 128 (FIG. 3) is carried into engagement with the dog 126 which, in turn, is thereby swung about its pivot 127 and carries a lug 130 on the remaining end of said dog into the course of the striker 124. The consequent push imparted to the gear from the striker through dog 126 is adequate to cause the pinion 118 to mesh with the gear 116 until the blank space 119 is returned to the pinion as indicated. The motion of dog 126 is limited by another pin 132, on the gear, which passes through an aperture 133 of diameter materially greater than the diameter of said pin. The manner in which, and means by which, the dog 126 is preset for it to be in readiness for its next operation will be indicated hereinafter.

Figure 6:
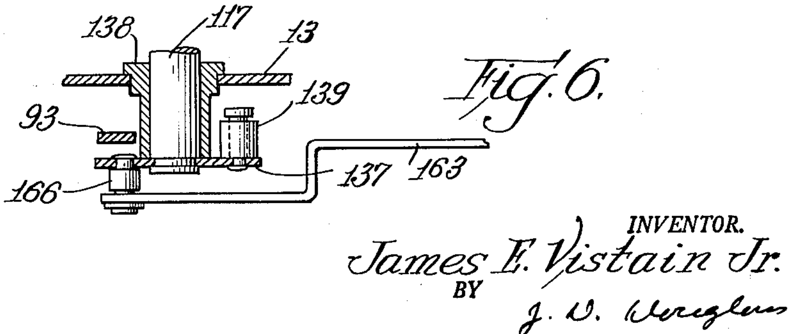
FIG. 6 is a fragmentary vertical section indicated by line 6—6 of FIG. 5.

The lever 93 (FIG. 5) is pivotally secured to the base at 134, and swinging motion is imparted to it by a crank plate 137 rigidly secured to the lower end of the shaft 117 (FIG. 6), the shaft being rotatably disposed in a bearing 138 on the base plate 13. A follower 139 on one side of the crank plate 137, is carried into engagement with the lever 93 to rock said lever against the resistance of spring 101 (FIG. 8) at the base of the spindle upon rotation of shaft 119 by the gear 116.

As the crank plate 137 is rotated through a cycle its operation is accompanied by movement of the pickup arm 15, at first upward, then outward to a position beyond the edge of a record on the turntable regardless of the size of said record. Then the pickup arm while still in elevated position is swung inwardly; that is, in a direction toward the spindle until the inward motion is arrested over the beginning of the sound groove of the record to be reproduced. This point, at which the pickup arm is arrested, is commonly referred to as the "let down" or "set down" point. In the present invention, the let down of the pickup arm is variable by novel mechanism to be described hereinafter. In order that the pickup arm may be manipulated, however, attention to the suspension of the pickup arm is timely. It includes on the pedestal 77 (FIG. 7) a boss 141 centrally of which is fixed a bushing 142 for support therein of a tubular shaft 143. The shaft is restrained against axial displacement upward by engagement of a flange 144, with the base plate 13. Axial displacement of the shaft 143 downward is resisted by a compression spring 146 confined between the base plate 13 and a C-washer 147 pinched about the shaft 143 in an annular groove 148 thereof. The shaft 143 affords bearing support for a second tubular shaft 149 telescoped therein. The shaft 149 is restrained from axial motion downward by a collar 151 clamped for axial adjustment thereof to said shaft, the collar engaging boss 141. The collar 151 bears a pair of vertical, spaced-apart arms 152 which are pivotally coupled, by a rod 153, to a pair of arms 154 embracing the arms 152, the arms 154 extending downward from a laterally adjustable pickup arm support mechanism 156 which is fully described in my copending application, Ser. No. 55,801, filed October 21, 1948. The pickup arm 15 is angularly adjustable about a substantially vertical pivot 157, of the mechanism 156, as well as swingable with the tubular shaft 149 within the shaft 143. The pickup arm 15 is adapted to be tilted or rocked vertically about the pin 153 on vertical motion of a lift pin 158, slidably journalled in the shaft 149.

The means by which the lift pin 158 is raised includes a swing-out mechanism indicated in its entirety by the reference character 159 (FIG. 5). It comprises a cam plate 161 which is pivotally supported on a post 162, carried by the base plate 13. A curved edge 155 of the plate, concentric with the post 162, is disposed in a groove slot 160 (FIG. 13) on a guide stud or stop 165, carried by the base plate 13, so that as the plate 161 is moved, support for the outermost portion of the plate is additionally provided to resist binding of the plate on post 162. The alignment of the pivot 162, lift pin 158, and the stud 165 also prevents tilting of the plate by the pin 158. The plate 161 is also coupled by a link 163 to the crank plate 137 by a pivot 164, on plate 161, and a pivot 166, on the plate 137, so that rotary motion of the crank plate is translated into swinging motion of the cam plate. The weight of the pickup arm is, of course, adapted to be partly supported by the record it is tracking. During this process, the lift pin 158 is free of the weight of the pickup arm since said pin rests against a dwell portion 167 of a vertically effective cam 168 on the plate 161. As plate 161 is swung outward at the beginning of its cyclic motion, however, the cam 168 is carried under the lift pin to move it upward. This upward movement of pin 158 is to an extent adequate for engagement and support of the pickup arm which is thereby supported in elevated relation to the turntable, or accumulation of records thereon, until cyclic motion of the plate 161 enables the lift pin to be restored to its record playing position on completion of a cycle.

In order to understand the means by which the pickup arm is moved outward once it is supported by the lift pin 158, it should be noted (FIG. 7) that the pickup arm support shaft 149 carries an impulse member or dual arm 170 at its lower end. The member 170 is rigidly fixed to shaft 149 and consequently is adapted to swing laterally with the pickup arm. Also, it should be noted (FIG. 5)

that the pin 164 which connects the link 163 to the cam 161 also affords a pivot connecting a contactor arm 171 to the plate 161. On its swingable end, the arm 171 carries a contactor pin or stop member 172 which is held in engagement with the edge of the plate 161 by a spring 173, one end of which is hooked around the pin 172 and the other end of which is hooked in a notch 173' on the edge of said plate remote from the contactor. As the contactor is carried in an outward direction, that is, in an orbit clockwise about the post 162, it engages the impulse member 170 and carries said arm before it to concurrently swing the pickup arm outward.

Due to the manner in which the contactor arm 171 cooperates with the plate 161, the pickup arm 15 is yieldably swung outward during a record playing cycle. This is a safety measure since grasping of the pickup arm to resist its outward motion, as for example, would be followed by elongation of the spring 173 as the plate 161 is moved away from the striker 172, thereby obviating breakage or deformation of the parts.

Cyclic motion of the gear 116 is adapted to be automatically initiated through means including a slider 174 (FIG. 3). As indicated in the application aforesaid, it is movable longitudinally thereof through a clearance aperture 176, in the base plate, its course being defined by a slot 177 therein through which the shaft 117 extends, and a slot 178 therein through which a stud 179, on the base plate, extends. At its outer end the slider has a lug 181 (FIG. 5) that extends laterally sufficiently to be in the course through which a pin 182 is carried, the pin being on one end of the impulse member 170. As the pickup arm 15 is moved inward, in tracking a record, the member 170 is moved counter clockwise (FIG. 5) until the pin 182 engages the lug 181 and moves the slider outward, or to the right as viewed in FIG. 3. When the slider moves outward, a second pin 183 on the inner end of the slider is carried into engagement with a friction lever 184, sandwiched between gear 116 and the dog 126 and also pivoted at 127 to said gear. At the end of reproduction of a record, the accelerated movement of the pickup arm as it engages the trip groove is communicated to the lever 184, as indicated, and there is sufficient frictional relationship between said lever and dog to normally resist displacement of one of the levers with respect to the other so that the dog 126 momentarily cooperates with the striker 124 for starting the gear 116. During the ensuing operation of gear 116, the slider is preset, i.e., moved to the left (FIG. 3) to its record playing position, the position it occupied at the start of reproduction of a record.

The means by which the slider is preset includes a comparatively resilient finger 188 (FIG. 5) carried by the cam plate 161 (FIG. 5). The slider, on the other hand, carries a pin 189. When the plate 161 is moved cyclically, the finger then cooperates with pin 189 to return the slider to its normal position.

The lever 184 (FIG. 3) is rotated counter-clockwise from the position in which it is indicated in FIG. 3, by its engagement with the pin 183 in order that it may pass the pin. The one end, after being rotated to this position extends beyond the periphery of the gear. The lever is preset or returned to its normal position as the gear rotates, and when the lever passes under the slider it engages with an offset 191 in the slider 174, which pushes it back to its original position.

In association with the operating member 170 is provided means for regulating the let-down of the pickup arm 15. Said means includes a control arm or set-down arm 192 (FIG. 9) which is carried on the reduced end of the tubular shaft 143, being staked to the end thereof. The set-down arm includes a zone 193 around the shaft (FIG. 7) to which a friction washer 194 of some suitable friction material such as cork is adhesively secured. Adjacent the lower end of the lift pin 158, there is provided an annular groove 196 into which is pinched a C-washer

197, to confine between it and the operating member 170 a compression spring 198 coiled about the lift pin 158.

Figure 15:
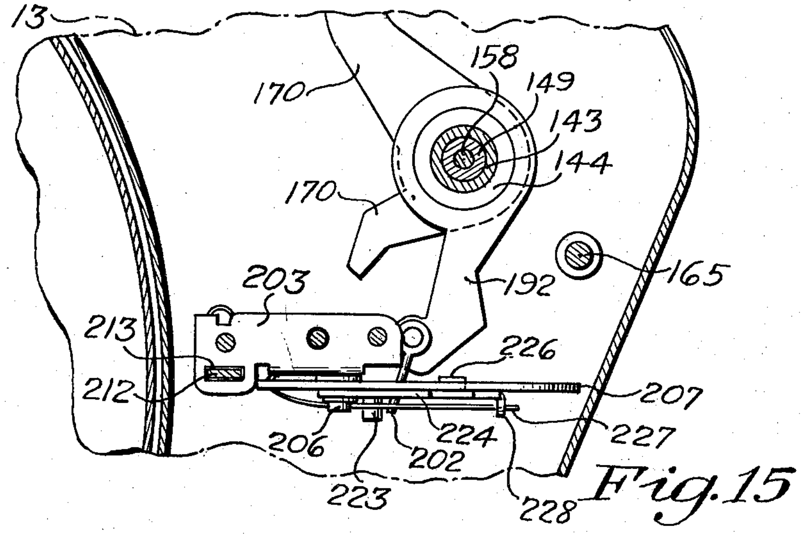
FIG. 15 is a sectional view corresponding to FIG. 9 but showing some of the parts in a different position.
Figure 16:
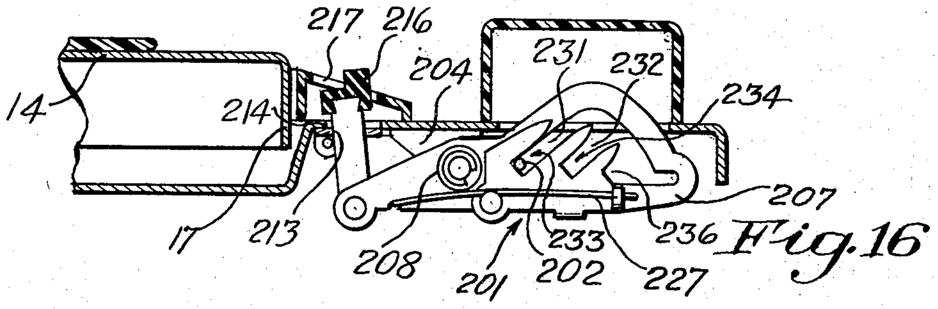
FIGS. 16 and 17 are sectional views corresponding to those of FIGS. 10 to 12, parts being in different positions.

When the lift pin 158 is in engagement with the dwell portion 167 of the cam plate (pickup arm lowered), the spring 198, although intimately associated with the member 170, is not in such a preloaded state as to support the pickup arm, there being a slight clearance after the order of 1/32 of an inch between the member 170 and the washer 194. This, of course, enables the member 170 to swing and the pickup arm to swing freely while the pickup arm is tracking a record, as previously indicated. When, however, the lift pin 158 is moved upward in the course of a cycle, its motion is conveyed to the member 170 through the spring and the member 170 is moved upward into pressure engagement with the friction washer 194. The consequent limited clutch relationship between the member 170 and arm portion 193, when the lift pin is in elevated position, is responsible for movement of the set-down arm 192 outward or in a counterclockwise direction from the position indicated in FIG. 15 to the position indicated in FIG. 9. This motion of the set-down arm is against the resistance of a tension spring 199 anchored to said arm. Both the member 170 and set-down arm are adapted to be swung into engagement with the stop 165 in order that a preset or predetermined angular relationship may be established between the members 170 and 194, the means for automatically selecting let-down points being described hereinafter.

Due to the clutch mechanism, by which the member 170 is coupled to the set-down arm 192 for angular movement therewith, it is possible, when the pickup arm is in cycle, to grasp said arm and move it angularly within limits without breakage or permanent deformation of any of the parts, since friction between member 170 and the set-down arm 192 is insufficient to positively resist the arbitrary movement of the pickup arm. This safety feature, besides the safety feature previously indicated, does not, however, interfere with the aligning function of the stud 165 if the normal horizontal swinging motion of the pickup arm is arbitrarily interfered with.

Inward motion of the arm 192, and hence the member 170 and its associated pickup arm from the stud 165, is limited by a selector mechanism 201. It, in turn, is subject to adjustment by the size of record on turntable 17 to vary the limit of the inward swing of arm 192, and consequently inward motion of the pickup arm. The limiting operation of the mechanism 201 is effective until the lift pin 158 is lowered whereupon the pickup arm is freed for tracking owing to disengagement of the clutch between the arms 170 and 192.

Figure 10:
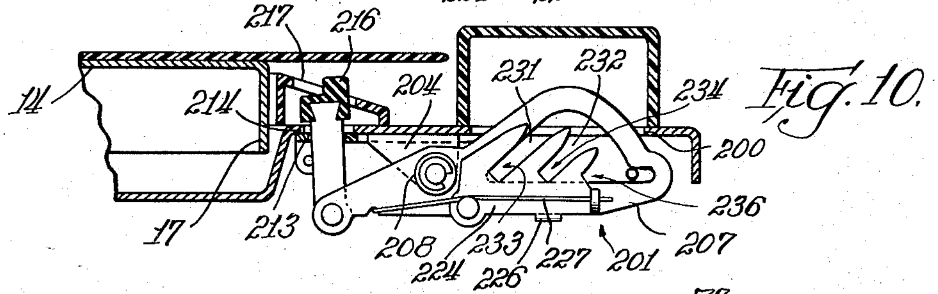
FIGS. 10, 11 and 12 are fragmentary vertical sections taken on line 10—10 of FIG. 9 showing the different portions broken by the different parts during operation.
Figure 11:
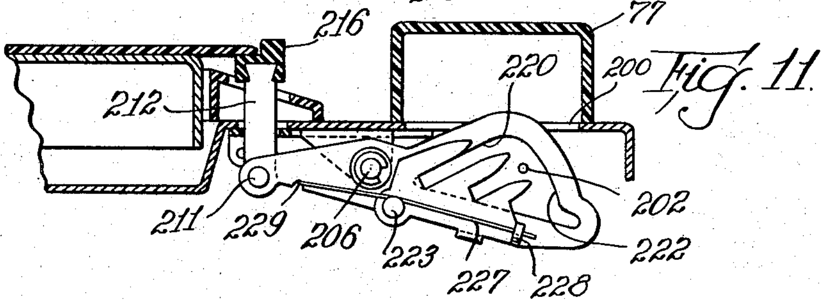
Figure 12:
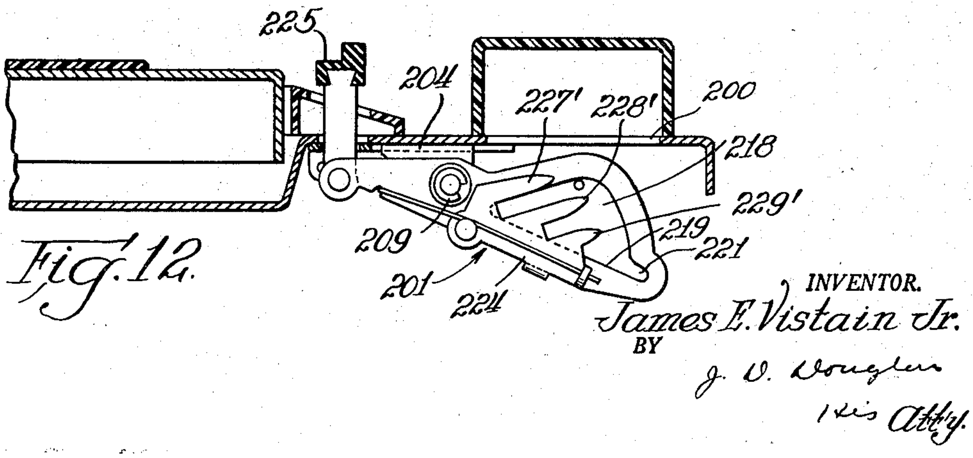

For cooperation with the selector mechanism 201, the control arm 192 bears, at its end, a finger 202. The selector mechanism 201, on the other hand, includes a bracket 203, rigidly attached to the base plate, and has an arm 204 extending normal to the plane through which finger 202 is carried. The arm 204 carries a stub shaft 206, and a selector lever 207 has a hub 208 which is journalled on the stub shaft 206, the hub being locked against removal from the shaft by some suitable means such as a C-washer 208 on the end of said shaft. Also the base plate 13 is apertured at 200 as a means of clearance for the selector mechanism 201 (FIGS. 10 to 12 incl.). To one end of the selector lever 207 is pivoted at 211 a detector link or vertically movable member 212 which is guided in a substantially vertical direction by a slot 213, in the bracket 203, said member 212 also passing freely through an aperture 214 in the base plate 13 and carrying at its upper end a pad 216 adapted to move freely through an aperture 217 in the escutcheon 38. The selector lever 207 to the right of shaft 206, is of increased width in a vertical direction and is provided with a clearance opening 218 of generally triangular formation within which the finger 202 is adapted to have lateral movement. A lower edge 219 of the aperture 218 is straight to a clearance notch 221 of width only wide enough to accommodate the finger 202. From the notch 221 a curvilinear or cam edge 222 extends to a third edge 220 extending obliquely from the edge 219 to further define the contour of opening 218. The aperture 218 is partly covered on one side thereof by a toothed interceptor member 224 which is pivoted at 223 to the lever 207. Motion of the toothed member 224 in one direction is limited by a lug 226 extending laterally of the base under the lever 207. Movement in the other downward direction is resisted by maintaining engagement between the lug 226 and lever 207 effected by a deflection spring 227 passing over the pivot 223 over which said spring is deflected by connection of one of its end to an ear 228, on the member 224, and connection of the other of its ends in a notch 229 on the lever 207. The combined center of gravity of lever 207 and cam 224 is to the right of the stub shaft 206 so that said lever and cam are biased by gravity clockwise about the stub shaft.

When the arm 192 is in engagement with the stud 165, the finger 202 is at the notch 221 (FIG. 10), said finger then supporting the lever 207 against rotation clockwise. When, however, the arm 192 starts its inward movement, the finger 202 is, of course, carried away from the notch 221 consequent to which operation the selector mechanism is enabled to rock clockwise by its own weight to an extent permitted by the finger 202 as it is moved to the left in engagement with the edge 222. Concurrent with this operation, the pad 216 is elevated. If the turntable 17 is bearing a 12-inch record (FIG. 10) the weight of this record is adequate to overcome the movement of the pad 216 to an elevation above the level of the turntable. If a 10-inch record is present on the turntable, its edge only partly covers the pad 216 but allows said pad to rise to an elevation higher than was permitted by the 12-inch record since the pad has a shoulder 225 at a level lower than the top of the pad, the shoulder 225 being adapted to engage the 10-inch record (FIG. 11). The case of a 7-inch record is indicated in FIG. 12 wherein it will be noted that there is no obstruction offered to vertical movement of the reach pad 216 so that it is enabled to reach a level above the top of the turntable. First, second and third positions are therefore provided for the lever 207 which determines the set-down point of the pickup arm for 7-, 10- and 12-inch records. These positions determine the ultimate position assumed by the finger 202 following its disengagement from the curvilinear cam surface 222 when the arm is rotated clockwise as viewed in FIG. 9.

The interceptor member 224 includes a series of teeth 227′, 228′ and 229′ slanting upward and to the right (FIG. 10) from the base of said member thereby providing slots 231 and 232 slanting upward from sockets 233, 234 and 236 at the edge 219 of lever 207. The finger 202 is adapted to be moved out af engagement with the cam surface 222 at a different point along said cam surface as the finger is carried inward, it being understood that the inward movement of the finger is due to the clockwise movement of the member 192. When the finger 202 leaves the edge 222, as when the selector mechanism 201 is in its first position (FIG. 10), it engages the tooth 229′ and enters the socket 236. The selector mechanism is rotated slightly upward or counterclockwise in the course of this operation due to the curved formation of the edge of the tooth 229′. This lowers the pad 216 and affords clearance between the pad and the record during its reproduction. When finger 202 has reached the socket 236, the arm 192 is, of course, unable to move farther, and the angular movement of the pickup arm inward toward the center of the turntable is arrested over the beginning of the sound groove of the 12-inch record. The pickup arm remains in this position until the end of a cycle when downward movement of lift pin 158 interrupts the frictional coupling between member 170 and the set-down arm 192 so that when the pickup arm is lowered into engagement with the 12-inch record said arm is freed for tracking the same.

The second position of the selector mechanism is indicated in FIG. 11. Therein it will be noted that the finger 202 leaves the cam surface 222 at a later point during a cycle than in the operation just described. It will also be noted that the tooth 288′ is sufficiently longer than tooth 229′ to intercept the finger 202 during its movement to the left when plate 207 is tilted farther clockwise from its FIG. 10 position. In a manner similar to the operation just described, the pad 216 is then retracted from the 10-inch record by cooperation between finger 202 and tooth 228′, thus rotating the selector mechanism 201 counterclockwise. The finger 202 coming to rest in engagement with socket 234, the inward motion of the pickup arm is arrested over the beginning of the sound groove of the 10-inch record, engagement of the pickup arm therewith being effected after the lift pin 158 is lowered.

When the selector mechanism 201 is enabled to rotate to the extent permitted by a 7-inch record, the entire edge 222 is engaged by the finger 202 as it is carried inward. Then, since it is continuous from the edge 222, the edge 220 has cam relationship with the follower 202 over which the edge climbs, as said follower is carried inward, the operation being accompanied by rocking of the selector mechanism 201 counterclockwise about pin 206. Also, the follower 202 is conveyed along a finger 227′ to a socket 233 at the base of said finger. From engagement with the socket 233 the follower is not freed until another cycle is initiated. In the meantime, the arm is freed from the arm 192 so that the pickup arm may perform its tracking operation on the 7-inch record, after the lift pin 158 moves downward.

Figure 17:
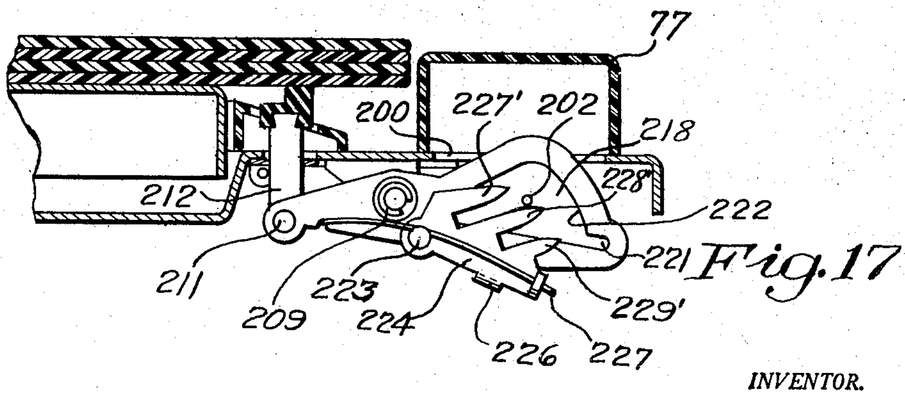

As already indicated the interceptor member 224 is biased counterclockwise about its pivot 223. This structural feature, rather than incorporation of the fingers 227′, 228′ and 229′ as integral parts of, or parts rigidly secured to the plate 207 has been adapted for the sake of safety. As it happens, it would be quite possible for an operator of the record player to replaces a 7-inch record, on the turntable, by a group of larger records of the 12-inch variety before the follower 202 has had time to be carried out from between the fingers 227′ and 228′. In this event, the 12-inch records would obstruct the selector mechanism's upward motion. In this event, weight of the 12-inch records would obstruct motion of the pad 225 and the finger 228′ would obstruct passage of the follower 202 outward in the course of a cycle. The plate 224 being movable, as described, it would be moved against resistance of the spring 227 on cam engagement of the follower 202 with the finger 228′ as a manner of freeing the follower (FIG. 17).

A brief resume of the operation is now in order.

With the records supported on the spindle and steadied by the steadying arm 16, the cycle can be started by moving the control lever to the reject position, or, by moving the tone arm toward the spindle.

Either movement moves the lug 130 on the lever 126 carried by the mutilated gear into the path of the striker 124 carried by the turntable hub, and the striker then moves the gear 116 into mesh with the pinion 118 (as has been previously described).

In the case of the reject lever, the pin 128 strikes the end of the lever 126 (FIG. 3) and moves it about its pivot 127.

In the case of the movement of the tone arm, the lever 182 swings with the tone arm and engages the hooked end 181 of the lever 174, the pin 126 of which engages the lever 184 that is in frictional engagement with the lever 126 to move it in the same manner.

When the gear 116 starts rotating this motion is communicated to the crank plate 137 below the base. The crank plate being connected by the link 163 to the cam plate 161 causes that plate to be swung clockwise about its pivot 162.

The first movement of the cam plate causes the cam 168 to raise the lift pin 158 which in turn raises the tone arm. The pin also, through the spring 198, raises the member 170 which may be called the pickup arm control lever, causing frictional engagement between it and the member 193 which may be designated the pickup arm positioning lever.

As the cam plate swings, the pin 172 engages the control lever 170. Because the two members are now frictionally engaged, this movement is also communicated to the position lever 192, the two members rotating in unison. The rotation of the lever 192 is, however, against the pressure exerted by the spring 199. The movement of the levers clockwise as viewed in FIG. 3 or counterclockwise as viewed in FIG. 9 also swings the pickup arm out beyond the periphery of the largest record.

It will be appreciated that the levers 192 and 170, although rotating together, may not, and seldom are, always in the same position of rotation relative to each other at the time they are brought into frictional engagement. On the other hand, it is desirable at some point in the cycle to have them attain a definite predetermined rotated position relative to each other because the lever 192, which operates only when the clutch is engaged, is the one that determines the position to which the pickup arm is returned and holds it in the proper position so that it may be lowered into engagement with the starting sound groove of the record.

This is effected by causing both of the levers 192 and 170 to engage with the support stud 165. This can best be seen in FIG. 9 where the pin 172 which is resiliently carried by the cam is pressing against the shorter arm of the lever 170 as well as the lever 192 and since they may slide relative to each other, they are both aligned by the pressure against the stud 165.

At this point the advantage of the pin 172 being resiliently carried by the cam plate becomes more apparent because, when the levers 192 and 170 engage the stop stud the pin 172 merely stops moving. The cam plate can continue in its movement (clockwise in FIG. 5) because the spring 173 stretches.

Inasmuch as the pickup arm is now to one side of the records (both on the turntable and the stack) it is now possible for a record to be discharged from the stack onto the turntable.

As can best be seen from FIG. 5, the crank plate has now rotated approximately 160 degrees from its starting position, and the pin 139 on the crank plate now engages with the free end of the lever 93 to swing it clockwise. This movement which is to the left as viewed in FIG. 8 rotates the bell crank lever 191 counterclockwise to cause the ejector mechanism in the center post to function and release a record from the stack.

The size of the record on the turntable eventually determines the position to which the pickup arm is returned, it being returned, its maximum distance for a 7″ record, a lesser distance for a 10″ record and the least distance for a 12″ record. It should be pointed out that it is not intended, as shown, to be used for playing mixed sizes of records, but merely for playing a stack of records of the same size whether they be 7″, 10″ or 12″ records.

In any event, the size of records being played determines the position of the selector 201, the various positions being depicted in FIGS. 10, 11 and 12 for 12″, 10″ and 7″ records respectively.

The crank plate has now rotated more than 180 degrees, and the record having been ejected from the stack onto the turntable, it now starts to pull the cam plate back toward its original position. It will be noted that, although both the levers 170 and 192 were pushed out by the pin 172 on the cam plate, the rotation of the levers in the opposite direction is effected only by the spring 199 which holds the levers against the pin 172 as the cam plate is pulled back toward its original position. During the backward movement of the lever or clockwise as viewed in FIG. 9, the finger 202 on the arm 192 is withdrawn from the notch 221 of the selector and the selector moves by gravity about its pivot. The arm 212 moves upward and its engagement or non-engagement with a record determines the position it assumes during the first part of the movement of the levers 170 and 192.

Figures 9, 13:
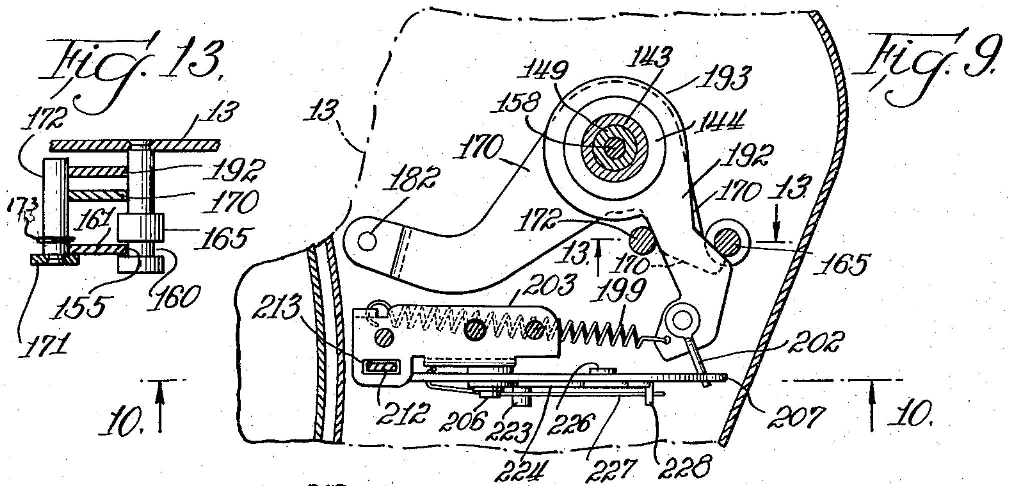
FIG. 9 is a fragmentary top plan view of the mechanism shown in FIG. 10, some of the parts being broken away to reveal structural features.
FIG. 13 is a vertical section taken on line 13—13 of FIG. 9.

The two levers then rotate inward or clockwise as viewed in FIG. 9 until the finger 202 engages one of the teeth 227′, 228′ or 229′ and then moves into one of the notches 233, 234, or 236. On its passage into the notch, the cam shape of the teeth causes the selector to be rocked slightly to bring the arm 212 down sufficiently far that the record engaging portion is withdrawn from engagement with the record. Since the elements 192 and 170 are still frictionally engaged, the pickup arm is rotated to the proper position over the starting groove of the record. At this time, the finger 202 bottoms in the notch and movement of the two levers and the pickup arm ceases. The pin 172 moves away from the sides of the two levers and they remain stationary.

The cam plate continues in its movement back to its original position. Eventually the lift rod 158 rides downward on the dwell 167. This lowers the pickup arm with its needle onto the record and also at the same time lowers the shaft 147 that swingably supports the pickup arm, withdrawing the control lever 170 from frictional or clutching engagement with the arm or position lever 192. The pickup arm and its support is now free to track a record and reproduce the vibrations recorded thereon.

The gear 116 continues its rotation, and as the friction lever 184 passes under the link 174 it is rotated by engagement with the offset part 191 back to its original or non-tripping position. The gear eventually rotates until the mutilated portion 119 is opposite the pinion at which time the index lever 121 holds it until it is subsequently released by the trip.

The record is then played, the pickup arm tracking in the record groove during this time the control 170 is moving with the pickup arm and eventually the pin, 182 on the end of the lever 170, engages the hook 181 on the lever 174 to again operate the lever 184 and through it frictionally the lever 126 to again start the changing cycle.

Although the invention has been described in one embodiment thereof, I am aware that numerous and extensive departures may be made therefrom without departing from the spirit or scope of my invention.

I claim:

1. In a phonograph record changer having a base and a turntable, for rotating a record to be played, carried on the base and magazine means for supporting a plurality of records to be played in a position for depositing them one at a time on the turntable and having a pickup arm disposed at one side of the turntable and arranged to be moved over the turntable for reproducing a record, the improvement which comprises means for supporting the tone arm for vertical swinging movement, including a hollow shaft, said shaft extending below said base and a pickup arm control member carried thereby, a sleeve disposed around said shaft extending below the base and having a pickup arm positioning member carried thereby in spaced relation above the control member, at least one of said members having friction means carried thereby between said members, a pickup arm lift rod slidably disposed in said hollow shaft and having one end disposed for engagement with the tone arm and the other end extending below the base beyond the control and positioning members, a cam plate below said base adapted to be reciprocated under said control, positioning members and lift rod and having a cam surface for engagement with the lift rod, said lift rod carrying a spring having one end supported by the lift rod near the cam engaging surface and the other end in engagement with the control member and arranged upon upward movement of the lift rod to force the hollow shaft upward and the control member carried thereby into engagement with the positioning member, said control member and positioning member each having a laterally extending arm and said cam plate having means thereon for engagement with at least one of said arms comprising a resiliently carried member having an arm engaging portion extending above the cam plate and in the path of travel of the control and position members, selector means disposed in the path of travel of the positioning member arm and having setting means for determining its position operable by a record on the turntable, said selector means formed with indexing stops thereon positioned for engagement with the positioning means in the path of travel thereof to stop said means at predetermined points.

2. In a phonograph record changer having a base and a turntable, for rotating a record to be played, carried on the base, and magazine means for supporting a plurality of records to be played in a position for depositing them one at a time on the turntable and having a pickup arm disposed at one side of the turntable and arranged to be moved over the turntable for reproducing a record, the improvement which comprises means for supporting the tone arm for vertical swinging movement, including a hollow shaft, said shaft extending below said base and a pickup arm control member carried thereby, a sleeve disposed around said shaft extending below the base and having a pickup arm positioning member carried thereby in spaced relation above the control member, spring means seated on the base around said sleeve and means on said sleeve above the base for engagement with the other end of the spring to hold the sleeve in position, a pickup arm lift rod slidably disposed in said hollow shaft and having one end disposed for engagement with the tone arm and the other end extending below the base beyond the control and positioning members, a cam plate below said base adapted to be reciprocated under said control member, positioning member and lift rod, and having a cam surface for engagement with the lift rod, said lift rod having means in engagement with the control member and arranged upon upward movement of the lift rod to lift the hollow shaft upward and carry the control member into engagement with the positioning member, said control member and positioning member each having a laterally extending arm and said cam plate having means thereon for engagement with at least one of said arms comprising a resiliently carried member having a portion extending above the cam plate and in the path of travel of the control and position members, selector means disposed in the path of travel of the positioning member arm and having setting means for determining its position operable by a record on the turntable, said selector means formed with indexing stops thereon positioned for engagement with the positioning means in the path of travel thereof to engage and stop said means at predetermined points in its path of travel.

3. In a phonograph record changer having a base, a rotatable turntable, for supporting a record to be played, carried on the base and magazine means for supporting a plurality of records to be played in a position for depositing them one at a time on the turntable and a pickup arm disposed at one side of the turntable and arranged to be moved over the turntable and lowered onto a record for reproducing the same, the improvement which comprises means for supporting the tone arm for vertical swinging movement above the base, including a hollow shaft that extends below said base and has a pickup arm control member carried thereby, a sleeve disposed around said shaft extending below the base rotatably supported thereby and having a pickup arm positioning member carried thereby in spaced relation above the control member and below the base, a pickup arm lift rod slidably disposed in said hollow shaft and having one end disposed for engagement with the tone arm and the other end extending below the base beyond the control and positioning members, a cam plate swingably supported on and below the base adapted to be reciprocated under said control member, positioning member and lift rod and having a cam surface for engagement with the lift rod, said lift rod having means for engagement with the control member and arranged, upon upward movement of the lift rod, to force the control member into engagement with the positioning member, said control member and positioning member each having laterally extending arms, a lever carried by the cam plate and having an upwardly extending means held in resilient engagement with the cam plate and extending beyond the cam plate a sufficient distance to be in the path of travel of the control and positioning arms, selector means pivotally supported by the base therebelow and having a portion extending through the base and arranged for engagement with a record on the turntable, said selector means formed with on opening defining a cam surface and a movable member having fingers extending opposite said opening pivotally carried by the selector member, said fingers defining slots having cam edges, and said positioning member carrying means extending into said opening and engageable with said cam surfaces and said fingers.

4. In a record player including a turntable on which a record of either of more than one size is adapted to be tracked by a pickup arm during which period of operation an elevator on the pickup arm is in a normal position, said elevator being arranged to be moved during a record changing cycle to cause disengagement of the pickup arm from the record being tracked, the combination of, a control member, a positioning member in coaxial relationship to the control member, said control member being swingable independently of the positioning member by said arm during tracking of the record but adapted to swing said arm during a record change cycle, movable selector in association with the turntable mechanism having first and second selector notches thereon, said selector mechanism being engaged by the positioning member and held thereby releasably retained in selected position by the positioning member during the tracking of the record, at a level below the top of the turntable, said positioning member being arranged to swing consecutively in opposite directions during a record change cycle thereby freeing the selector mechanism for movement to a height above the top of the turntable when the diameter of the record thereon is at least as small as the diameter of the turntable thereby to carry the first of the notches into the plane of motion of the positioning member, movement of the selector mechanism upward being limited by engagement with a record of diameter greater than the diameter of the turntable during a cycle thereby to position the second of the notches in the plane of motion of the positioning member, means by which the control member is adapted to swing the positioning member including a clutch element between said members, said element being ineffective to provide clutch relationship between said members during tracking of a record but effective to provide clutch relationship by the elevator when said elevator is moved away from its normal position, a pause in the inward motion of the control member being caused by cooperation thereof with either of the notches until the pickup arm is lowered into operative engagement with either of the two sizes of records by return of the elevator to its normal position.

5. In a record player including a turntable on which either of two sizes of records are adapted to be tracked by a pickup arm, the combination of, an elevator in a normal position during the tracking of a record and movable away from said position at the start of a cycle to rock the pickup arm upward, a control member on the vertical axis of the pickup arm, a positioning member in coaxial relation to the control member, said positioning member being swung consecutively in opposite directions during a cycle, said control member being swingable independently of the positioning member by the pickup arm during tracking but adapted to swing said arm during a cycle, means by which the pickup arm is adapted to be swung laterally when rocked upward including a resilient link carried by the elevator to impart force therefrom to one of the members when said elevator is moved away from its normal position to displace said one member slightly toward the other member whereby limited clutch relationship is established between the members, said clutch relationship providing for movement of the members together outward, said clutch relationship also permitting a preset relationship between the members to be restored when they are moved to their outermost position after one of the members is displaced angularly with respect to the other member by tracking, means by which the inward movement of the members is adapted to be interrupted at either of two angular locations comprising a follower on the positioning member, selector mechanism adapted to pivot about an axis in fixed relationship to the turntable, contactor means coupled to the selector mechanism said contactor means being movable vertically beside the turntable from below to above the level of the top thereof when the selector mechanism is moved about its axis, a test cam adapted to cooperate with the follower as it is moved inward to govern the height to which the contactor means is moved upward, said test cam being adapted to cooperate for its entire length with the follower when the record on the turntable is at least as small as the diameter of said turntable, engagement of a record larger than the diameter of the turntable with the contactor being adapted to resist rocking of the selector mechanism to its extreme position to limit the cooperation between the test cam and follower, first socket means on the selector mechanism in spaced relationship to the test cam, a first selector cam continuing from said test cam to said first socket means, said first selector cam being adapted to guide said first socket means into engagement with the follower by rocking the selector mechanism until the follower is in stopped engagement with said first socket means to cause a pause in the inward motion of the pickup arm until the elevator is returned to its normal position, second socket means on the selector mechanism between the first socket means and the test cam, and a second selector cam in extension from the second socket means, said second selector cam being adapted to intercept the follower when it has cooperated with the test cam for less than its entire length and thereafter to guide the second socket means into engagement with the follower by rocking the selector mechanism to cause a pause in the inward movement of the pickup arm until the elevator has been returned to its normal position.

6. In a record player including a turntable on which either of two sizes of records are adapted to be tracked by a pickup arm, an elevator in a normal position during the tracking of a record, the elevator being movable away from its normal position at the start of a cycle to rock the pickup arm upward, a control member on the vertical axis of the pickup arm, a positioning member in coaxial relation to the control member, said positioning member being swung consecutively in opposite directions during a cycle, said control member being swingable independently of the positioning member by the pickup arm during tracking but adapted to swing said arm during a cycle, means by which the pickup arm is adapted to be swung laterally when rocked upward including a resilient link carried by the elevator to impart force therefrom to one of the members when said elevator is moved away from its normal position to displace said one member slightly toward the other member whereby limited clutch relationship is established between the members, said clutch relationship providing for movement of the members together outward, said clutch relationship also permitting a preset relationship between the members to be restored when they are moved to their outermost position after one of the members is displaced angularly with respect to the other member by tracking, means by which the inward movement of the members is adapted to be interrupted at either of two angular locations comprising a follower on the positioning member, selector mechanism adapted to pivot about an axis in fixed relationship to the turntable, the selector mechanism being tangent to the arc through which the follower is carried, first and second steps on the selector mechanism beside the turntable, said selector mechanism being biased for movement of the steps from below to above the level of the top of the turntable, a test cam on the selector mechanism for cooperation with the follower during inward swing of said follower, said cooperation providing a relationship between upward travel of the steps and tilt of the selector mechanism, first and second selector cams on the selector mechanism, said selector cams extending toward the test cam and terminating in free ends in spaced relationship to said test cam, tilt of said selector mechanism carrying the free ends severally into the plane through which the follower is carried, movement of the first of the free ends beyond said plane being resisted by engagement of the first of the steps by one size of record on the turntable until said first selector cam is engaged by the follower, movement of the second of the free ends beyond said plane being resisted by engagement of the second of the steps by a record of greater size on the turntable until the second of the selector cams is engaged by the follower, cooperation of the follower with either of said selector cams tilting the selector mechanism in a direction opposite to the direction said selector mechanism is tilted by cooperation between the follower and the test cam to disengage either of the steps from a record, a first socket at the base of the first selector cam to engage the follower after it has passed over said first selector cam for arresting inward travel of the follower at one angular point, and a second socket at the base of the second selector cam to engage the follower after it has passed over said second selector cam for arresting inward travel of the follower at another angular point, cooperation between the first socket and follower being adapted to cause a pause in the inward swing of the pickup arm above the beginning of said one sized record, cooperation of the second of said sockets with the follower causing a pause in the inward swing of the pickup arm above the beginning of said greater sized record, said pauses with either records continuing until the elevator has been returned to its normal position.

7. In a record player including a turntable on which records of a plurality of sizes are adapted to be tracked by a pickup arm, lift means in association with the pickup arm, said lift means during said tracking period being in a normal position but being movable therefrom at the start of a cycle to rock the pickup arm upward, a torque member on the vertical axis of the pickup arm, a positioning member in coaxial relation to the torque member, said positioning member being swung consecutively in opposite directions during a cycle, said torque member being swingable independently of the positioning member by the pickup arm during tracking but adapted to swing said arm during a cycle, means by which the pickup arm is adapted to be swung laterally when rocked upward including resilient means carried by said lift means to impart force from said lift means to one of the members when said lift means is moved away from its normal position to displace said one member slightly toward the other member whereby limited clutch relationship is established between the members, said clutch relationship causing both of the members to move together outward, said clutch relationship also permitting a preset relationship between the members to be restored after one of the members is displaced angularly with respect to the other member by tracking, means by which inward movement of the members is adapted to be interrupted at a plurality of points about the axis thereof comprising a follower on the positioning member, selector mechanism adapted to pivot about an axis in fixed relationship to the turntable, a plurality of steps on the selector mechanism beside the turntable, said selector mechanism being biased for movement of the steps from below to above the level of the top of the turntable, a plurality of retractor cams on the selector mechanism, a release cam also on the selector mechanism for cooperation with the follower as said follower is moved from its outermost position inward, said cooperation gradually releasing said selector mechanism for movement of the steps upward concurrently with movement of each of the selector cams consecutively and severally through the plane in which the follower is carried, said steps being carried to their uppermost extremity when a first record of diameter less than the diameter of the turntable is disposed thereon thereby detaining a first of the selector cams in the plane of the follower until said follower is carried into engagement therewith, each of the remaining steps being severally engageable with a different size of record to detain a different selector cam in the plane of the follower for cooperation therewith, cooperation of said follower with any of said selector cams serving to draw the steps downward, a socket in connection with each of the selector cams, each of the sockets being adapted to engage the follower for interruption of its inward movement at a different angular position thereby to cause a pause in the inward motion of the pickup arm until said arm is lowered by motion of said lift means to its normal position.

8. In a record player having a turntable on which records of a plurality of sizes are adapted to be tracked by a pickup arm which is rocked out of engagement with a record by movement of an elevator away from a normal position thereof by cyclic operation of said record player, the combination of, a control member on the vertical axis of the pickup arm and swingable therewith, a positioning member in coaxial relationship to the control member, said positioning member being swingable consecutively in opposite directions during a record changing cycle, a follower on the positioning member, said control member being swingable independently of the positioning member during tracking but moveable by the positioning member when the elevator is moved away from its normal position, selector mechanism comprising a first selector element, at least one test element coupled to the first selector element for vertical movement beside the turntable from below to above the level of said turntable, a second selector element in movable association with the first selector element, alignment means in association with both elements for resiliently maintaining a state of alignment therebetween, anchor means in fixed relation to the turntable for anchoring the elements in movable association with said turntable, the elements being biased for moving the test element upward, a plurality of fingers on the second of the elements, said fingers slanting upward in substantially spaced relation to each other from the level of the course through which the follower is carried, a socket in association with each of the fingers, the follower being received by a first socket when a first sized record of diameter less than the turntable diameter is being tracked, cooperation between the follower and first socket being for retention of the selector mechanism in one position wherein the test elements are below the level of the turntable top, cooperation of the first finger and follower as said follower is moved outward gradually releasing the test element for movement upward when tracking of the first sized records has been discontinued and for freeing said follower for engagement with one of the other sockets on its inward travel, replacement of the first sized records by a plurality of larger sized records on the turntable before the follower has had time to move out of the first socket limiting upward movement of the test member thereby limiting the motion of the first selector element, said second selector element then being moved out of alignment with the first element by cooperation between the follower and a second of the fingers to free the follower.

9. In a record player having a turntable on which records of a plurality of sizes are adapted to be tracked by a pickup arm which is arranged to be rocked out of engagement with a record by movement of an elevator by cyclic operation of said record player, the combination of, a control member on the vertical axis of the pickup arm and swingable laterally therewith, a positioning member in coaxial relationship to the control member, said positioning member being swingable consecutively in opposite directions during a record changing cycle, a follower on the positioning member, said control member being swingable independently of the positioning member during tracking but movable by the positioning member when the elevator is moved away from its normal position, selector mechanism including a carrier plate for halting the swinging movement of the pickup arm in one of a plurality of let-down points selectable by the size of record on the turntable, pivotal means by which the selector means is rotatable about a horizontal axis in fixed relationship to the turntable, a plurality of test surfaces coupled to the carrier plate for vertical movement beside the turntable from below to above the level of the top of said turntable, a selector plate in pivotal association with the first carrier plate, alignment means comprising a stop on one of the plates, and resilient means to bias the other plate into engagement with said stop, the selector mechanism also being biased about the horizontal axis for moving the test surfaces upward, a plurality of cam members slanting upward from the second of the plates, and a stop portion in association with each of the cam members, each of said stop portions and cam members being substantially at the level of the course through which the follower is carried, the follower being engaged by a first stop portion after cooperation with the first of the cam members, said cooperation withdrawing the test surfaces from above the level of to below the level of the turntable when a first sized record of diameter less than the turntable diameter is on said turntable, cooperation between the follower and first cam member on outward travel of said follower releasing the selector mechanism for moving the test surfaces upward, replacement of the first sized record by a plurality of larger sized records before the follower has had time to move out of engagement with the first cam member causing a second of the cam members to be moved into the course of the follower on engagement of one of the steps by said larger sized records, the selector plate then being moved with respect to the carrier plate by cooperation between the follower and said second cam member against the resistance of the resilient means until said follower is freed for engagement by another cam member later in the operation of the follower.

10. An automatic record player for playing records of different sizes wherein a turntable is provided and a record magazine means supports records above the turntable and drops them one at a time onto the turntable and wherein a pickup arm is moved over the turntable to reproduce recorded sounds therefrom, means for supporting and controlling the movement of said tone arm comprising a base, a support for supporting the tone arm for vertical and horizontal movement thereof at one side of the turntable including a tubular member carrying the tone arm at the upper end and extending below the base and being rigidly connected thereto a tone arm control member including a disc shaped hub portion with at least one arm extending outwardly therefrom, a tone arm positioning member comprising a sleeve rotatably journalled around the tubular member and extending below the base and having a disc shaped hub portion extending opposite to and in spaced relation to said first mentioned disc, said last disc having an arm extending radially therefrom and carrying an index locator at its end, a pickup arm lift rod reciprocably journalled in said tone arm support and extending therethrough from opposite ends one end being arranged to engage the tone arm for rocking it vertically, the other end extending below the control member and resilient means carried adjacent the end for engagement with and to move the control member, a reciprocable cam plate disposed below the lift rod and having a cam surface for engaging the lift rod to move it upward and to force the control member and positioning member into operative engagement with each other, a selector mechanism for controlling the position of the control member comprising a body pivotally supported below the base having an opening therein at one side of the pivot the edges of which define a cam surface for engagement with the index locator, the other end of said body being provided with a record feeler extending upward through the base and having portions for engagement with records of different sizes, an index plate carried by said body and having fingers defining index stops extending inwardly of said opening in the path of movement of said index locator.

11. An automatic record changer where a turntable is provided and magazine means supports records above the turntable for dropping them one at a time on the turntable and means is provided for raising, lowering and swinging the pickup arm comprising a base, a housing supported on the base and having an upper wall in spaced relation to the base, a positioning sleeve rotatably journalled in the housing and base and having a hub member disposed below the base in contact therewith and spring means seated in the base, surrounding the sleeve and engaging means on the sleeve for holding the sleeve in position, a positioning member supported thereby and comprising a disc shaped hub having a positioning arm extending therefrom and carrying an index feeler projecting outwardly from the arm, a pickup arm support sleeve rotatably and reciprocably journalled in the positioning sleeve and extending therethrough with the upper end supporting said pickup arm for vertical rocking and horizontal swinging movement, the lower end of the pickup arm support sleeve having a disc shaped hub thereon disposed in spaced relation from the hub on the positioning member and having at least one radially extending arm thereon, a pickup arm lift rod slidably journalled in said pickup arm support sleeve and extending beyond the ends of said sleeve with the upper end arranged to engage and rock the pickup arm vertically and the lower end having a resilient member connected thereto and engaged with the pickup arm support sleeve, a reciprocable cam member disposed below said lift rod and having a cam surface disposed for engagement with the lift rod to force the lift rod upward and to cause the resilient means to force the disc like hubs together into limited frictional engagement with each other, resilient means on said cam member arranged for cyclic engagement with said arms on the positioning and control member, an index means for the positioning member controlled by the size of record on the turntable comprising a member pivotally supported from the base and carrying a record feeler at one end and having an index feeler engaging portion on the opposite end, said index feeler engaging portion comprising an opening formed in said member the upper edges of which comprise a cam surface arranged to be contacted by the feeler for moving the index means upon movement of the positioning means, a finger member pivotally secured to the index member and means for resiliently holding it in predetermined position on the index member, said finger member having a plurality of fingers extending over said opening in a position to intercept said feeler member, and means formed in said index member for engagement with the feeler member to hold the index member in a predetermined position with the record feeler below the plane of records on the turntable and arranged to be released by the feeler to cause the record feeler to engage with the underside of a record on the turntable, said index member being positioned by said record to cause one of the fingers to be positioned in the path of said feeler to intercept its movement, and means on said cam to move said feeler member and the positioning member out of engagement with the fingers, and said feeler to engage said cam surface on the index member to retract said record feeler.

References Cited in the file of this patent

UNITED STATES PATENTS

| | | |
|---|---|---|
| 2,271,001 | Fortune | Jan. 27, 1942 |
| 2,376,741 | Weaver | May 22, 1945 |
| 2,488,260 | Ascoli | Nov. 15, 1949 |
| 2,584,257 | Cain | Feb. 5, 1952 |
| 2,601,501 | Cain | June 24, 1952 |
| 2,616,703 | Leonard | Nov. 4, 1952 |

FOREIGN PATENTS

| | | |
|---|---|---|
| 320,516 | Great Britain | Oct. 17, 1929 |
| 664,630 | Great Britain | Jan. 9, 1952 |